United States Patent
Winslow

(10) Patent No.: US 6,467,780 B1
(45) Date of Patent: Oct. 22, 2002

(54) PORT-FOLIO ON WHEELS

(76) Inventor: Gloria Maxine Winslow, 547 Maryann La., West Hempstead, NY (US) 11552

( * ) Notice: Subject to any disclaimer, the term of this patent is extended or adjusted under 35 U.S.C. 154(b) by 0 days.

(21) Appl. No.: 09/658,889

(22) Filed: Nov. 30, 2000

(51) Int. Cl.[7] .............................. B62B 3/10; B42F 7/14
(52) U.S. Cl. ..................... 280/47.35; 280/79.3; 211/50
(58) Field of Search ............................ 280/47.35, 79.3, 280/47.19, 47.27, 47.26, 47.28, 47.34; 211/49.1, 59.1, 50; 16/35 R; 206/504, 515

(56) References Cited

U.S. PATENT DOCUMENTS

| | | | | |
|---|---|---|---|---|
| 576,453 A | * | 2/1897 | Henderson | 211/50 |
| 706,630 A | * | 8/1902 | Allen | 211/50 |
| 2,626,062 A | * | 1/1953 | Manzella | 211/59 |
| D175,719 S | * | 10/1955 | Frick | D14/3 |
| 3,788,487 A | * | 1/1974 | Dawson | 211/49 |
| 4,119,044 A | * | 10/1978 | Hines | 280/47.35 |
| D282,691 S | * | 2/1986 | Latino | 280/47.35 |
| 4,760,927 A | * | 8/1988 | Dechirot | 211/54.1 |
| 4,824,273 A | * | 4/1989 | Silva et al. | 402/79 |
| 4,861,050 A | * | 8/1989 | Bergeron | 280/47.35 |
| D321,773 S | * | 11/1991 | Chiang | 280/47.35 |
| 5,123,666 A | * | 6/1992 | Moore | 280/47.28 |
| 5,294,138 A | * | 3/1994 | Yang | 280/47.35 |
| 5,325,616 A | * | 7/1994 | Valiulis | 40/299 |
| 5,669,466 A | * | 9/1997 | Cheng | 188/112 |
| 5,690,155 A | * | 11/1997 | Millar | 150/159 |
| 6,224,072 B1 | * | 5/2001 | Weck et al. | 280/47.35 |

* cited by examiner

Primary Examiner—Brian L. Johnson
Assistant Examiner—Jeff Restifo
(74) Attorney, Agent, or Firm—Alfred M. Walker

(57) ABSTRACT

A PORT-FOLIO ON WHEELS has a wheeled horizontal platform from which two posts project rigidly upward near the rear corners of the platform. The tops of the post point inward and slightly upward. An "L" shaped hand grip is attached to the top of the post for transporting. Two slender guide posts are attached three inches in front of the back of the platform, spaced 8" apart, the same distance as a standard notebook paper clip to add, subtract and support the plastic picture protectors. The plastic picture protectors, protect the pictures from weather dust, and finger smudges. A free-floating top cover with the weight of about one pound rests on top of the picture protectors to eliminate unnecessary disturbance to the materials. The caster wheels underneath lock to stabilize the Port-Folio On Wheels from drifting away when unattended. A vinyl drape covering can be included with either snap or zipper closure to further protect the transported materials from server weather damage.

1 Claim, 2 Drawing Sheets

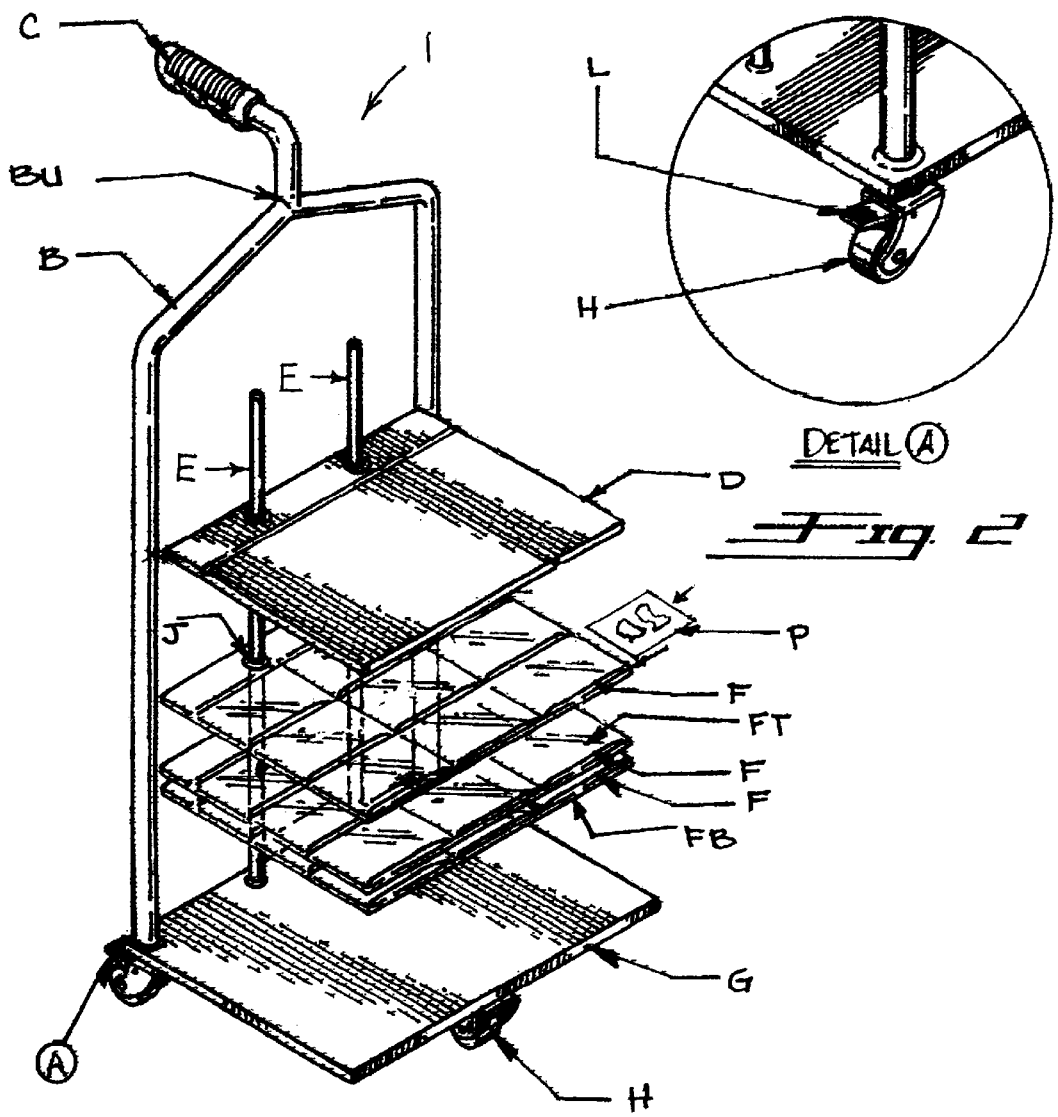

PORT-FOLIO ON WHEELS

BACKGROUND OF THE INVENTION

1. Field of the Invention

The present invention relates to carriers for flat view able items, such as photographs, music sheets, art work and the like.

2. Description of the Prior Art

People commonly use portfolios to store art or design work, photographs or precious memorabilia. Once these portfolios are filled, however, they can become heavy and difficult to transport in tote bags or other items of luggage. Consequently, one usually must carry a portfolio in ones arms, movement that is awkward due to the portfolio's size and weight.

BRIEF SUMMARY OF THE INVENTION

My invention PORT-FOLIO ON WHEELS will provide a convenient, durable portfolio that would be attached to a cart-like frame to allow the portfolio to be quickly and easily transported. It would be ideal for transporting photos, sheet music, reports and artwork. PORT-FOLIO ON WHEELS would be constructed from durable material and could be easily stored.

PORT-FOLIO ON WHEELS would be marketed to consumers of all ages. Possible target markets would be professional and amateur photographers, teachers, musicians and professional/amateur artists.

PORT-FOLIO ON WHEELS could be sold through department, discount department and luggage stores. Other distributes might be mail order companies and businesses specializing in art or photography supplies.

Because of the problem that Port-Folio On Wheels addresses and solve through its application, consumers will find such an invention attractive and appealing.

BRIEF DESCRIPTION OF THE VIEW OF THE DRAWING

FIG. 1 is a perspective view of the port-folio on wheels of the present invention;

FIG. 2 is a close-up view of the wheel portion thereof, shown as detail "A" in FIG. 1; and, FIG. 3 is an exploded perspective view of an alternate embodiment for a removable cover shown insert able over the port-folio on wheels of the present invention, in the direction of the arrows indicated therein.

DETAILED DESCRIPTION OF THE PREFERRED EMBODIMENTS

Figure 3:
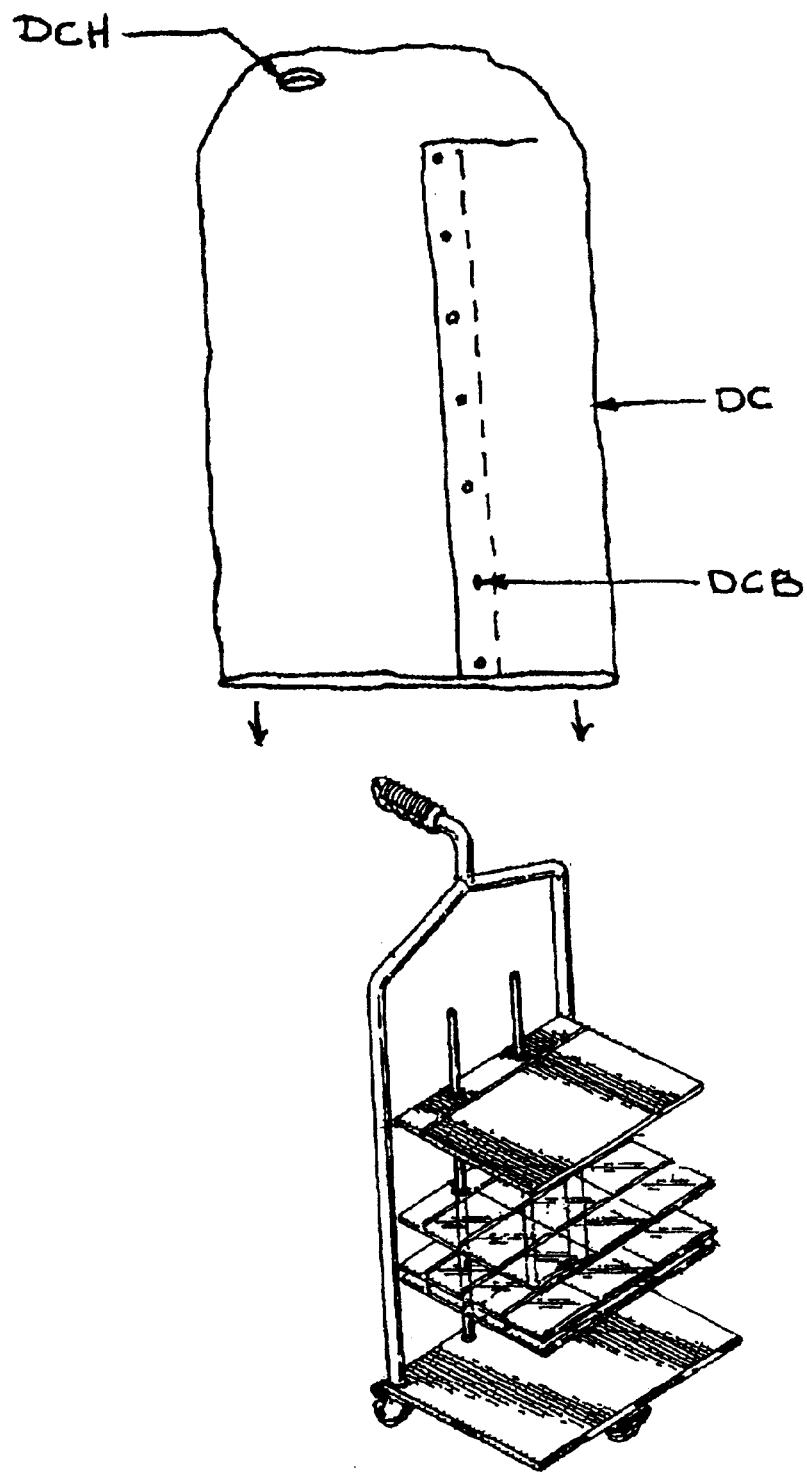

The construction of the portable PORT-FOLIO ON WHEELS, designated as reference numeral 1 in FIG. 1, calls for materials such as plastic, steel, aluminum and rubber as its major components. An alphabetical list and written description of the reference letters shown in drawing FIGS. 1, 2 and 3 is as follows:

A=the wheels should be equipped with a locking device to prevent the platform from sliding away on an uneven surface. The locking device might be a lever that could be operated by hand or foot to lock the wheels in place.

B=A roughly rectangular form with a triangular top section will be attached to the back of the platform. The frame would be made from steel or aluminum tubing that would branch off to form the handle.

BU=upward edge portion of rectangular frame B.

C=An L-shaped handle connected to the top of the triangular frame, would have a horizontal hand grip with a protective plastic or rubber cover, used for pulling or pushing the PORT-FOLIO ON WHEELS.

D=A free floating cover that can be removed for adding or decreasing the number of sheet protectors. It also serves as, a heavy-duty cover, for added protection to slide on to the top of important material.

E=Guide post or rods to hold the sheets in place. The guidepost should be spaced the same distance apart as the holds in notebook paper in order to use pre existing sheet protectors.

F=Photo or sheet protectors that can be purchased at any discount store. The design only show the letter F, diagram for further understanding of its use.

FT=top of transparent pocket F.

FB=bottom of transparent pocket F.

G=Base platform, which is a rectangular platform that could be manufactured from steel to form a support for the portfolio.

H=The three caster -styled rubber wheels would be attached to the underside of the platform to allow the PORT-FOLIO ON WHEELS to be easily wheeled from one location to another.

J=holes of photo or sheet protectors F. Upright support guide posts E are insert able within holes J of photo or sheet protectors F.

L=lock for caster wheel H.

P=flat view able items such as photographs, sheet music sheets, artwork, catalog pages and related flat merchandise items insert able within flat transparent pockets F.

A vinyl plastic cover DC (optional) with a zipper (not shown) or snap closure DCB could also be supplied with PORT-FOLIO ON WHEELS. The cover DC would provide additional protection from dust, rain, snow, mud, dirt and ice. A hole DCH can snugly accommodate handle C therethrough.

When fully constructed, Port-Folio On Wheels would measure approximately 36 inches in height, 14 inches in length and 12 inches in width.

Simply slide the photo protectors and the cover onto the rods, grasp the handle and pull or push PORT-FOLIO ON WHEELS to the desired location.

It may prove useful to explore the idea of a permanently attaching a cover to the platform The cover could be made from vinyl plastic or from a durable material such as rubber, leather or nylon. Because the platform and its contents are so close to the ground level, the portfolio pages could easily be accidentally spattered with water, dirt or mud. A permanent cover, however, would protect the contents from damage.

In addition, the wheels should be equipped with some type of locking device to prevent the portfolio from sliding away on uneven surfaces. The locking device might be a level that could be operated by hand or foot to lock the wheels in place.

Furthermore, FIG. 1 shows a combination portable portfolio 1 transporting a plurality of flat view able items P. including at least one of photographs, sheet music sheets, artwork, catalog pages and related flat merchandise items, within a plurality of flat transparent pockets F, each of said transparent pockets F having a top viewing surface FT and a bottom support surface FB, each of said transparent pockets F having insert able therein at least one flat view able item P.

Each of said flat transparent pockets F has a plurality of holes J engagable with a respective upright support guide post E of a plurality of upright support guide posts E holding the flat transparent pockets F in a stacked relationship on top of each other, wherein each top viewing surface FT of each pocket F is maintained facing upward, exposing for viewing a top most flat view able item P.

Each flat transparent pocket F is vertically movable upward along the pair of upright support guide posts E for exposing a next subsequent flat transparent pocket F underneath for viewing as a next subsequent topmost view able item P.

The upright support guide posts E are attached to, and extend upward from, a movable horizontal base platform G.

The movable horizontal base platform G has a plurality of wheels H maintaining the base platform G in a stable and movable configuration.

Each of said wheels H has an engagable lock L alternately locking and unlocking the wheel H for alternate parking and moving of the portable portfolio 1.

The horizontal base platform G has a generally rectangular frame B extending therefrom with at least one handle C extending from an upward edge portion BU for manual grasping of the handle C to transport the combination portfolio 1 and flat view able items P thereon.

It is further known that other modifications may be made to the size and shape of the product's components of the present invention, within the limits of technology, wherein these modifications are made within the scope of the invention, as noted in the appended Claims.

What is claim is:

1. A combination portable portfolio transporting a plurality of flat view able items, including at least one of photographs, sheet music sheets, artwork, catalog pages and related flat merchandise items, comprising:

a removable free floating flat protective top cover covering a plurality of flat transparent pockets, each of said transparent pockets having a viewing surface and a support surface, each of said transparent pockets having insert able therein at least one flat view able item;

said removable free floating flat protective top cover and each of said flat transparent pockets having a plurality of holes in positional register with each other, each said hole engagable with a respective upright support guide post of a plurality of upright support guide posts holding said plurality of flat transparent pockets in a stacked relationship on top of each other, wherein each said viewing surface is maintained facing upward, exposing for viewing a top most flat view able item of said plurality of each said flat view able items;

each said flat transparent pocket being vertically movable upward along said pair of upright support guide posts for sequentially exposing a next subsequent flat transparent pocket underneath for sequential viewing of a next subsequent topmost view able items;

said plurality of upright support guide posts being attached to, and extending upward from, a movable flat, unencumbered horizontal base platform;

said movable horizontal base platform having a plurality of wheels maintaining said base platform in a stable and movable configuration;

each of said wheels having an engagable lock alternately locking and unlocking said wheel for alternate parking and moving of said portable portfolio;

said horizontal base platform having a generally rectangular frame extending therefrom with at least one handle extending from an upward edge portion for manual grasping of said handle for transporting said combination portfolio and said plurality of flat view able items thereon; and, a removable cover; said removable cover having a hole at an upper end snugly accommodating said handle therethrough.

* * * * *